3,556,596
EXTRACTION OF SOLUBLE MATERIAL FROM NATURAL DEPOSITS

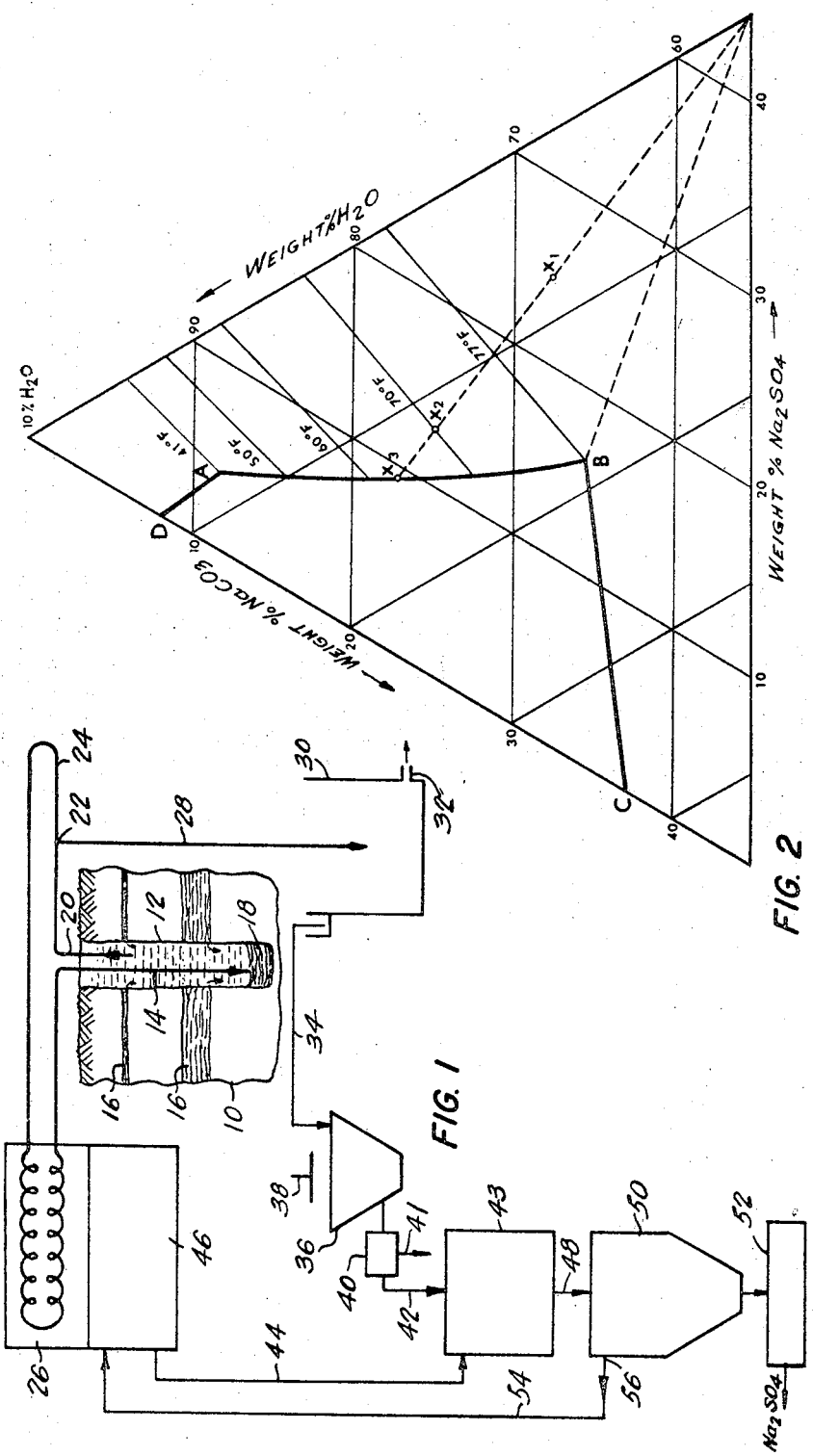

William Andrew MacWilliams and Leonard Bithel, Edmonton, Alberta, Canada, assignors to Chemcell Limited, Montreal, Quebec, Canada
Filed Nov. 21, 1968, Ser. No. 778,919
Claims priority, application Canada, Jan. 16, 1968, 010,036
Int. Cl. E21b 43/28
U.S. Cl. 299—5                                          5 Claims

ABSTRACT OF THE DISCLOSURE

A process and apparatus for extracting and pre-purifying in situ Glauber's salt from a subterranean deposit which generally contains mud, the said process comprising:

(a) making within said subterranean deposit a solution of at least a portion of said deposit and thereby allowing a portion of the mud to settle down near the bottom of said deposit;
(b) collecting the upper portion of said solution.

---

This invention relates to a method for extracting soluble hydrated salts. More particularly, this invention relates to a continuous method for the extraction of Glauber's salt, and the production of high grade sodium sulfate. Glauber's salt is the decahydrate of sodium sulfate, $Na_2SO_4 10H_2O$, and contains 55.9% of water. The sodium sulfate salts are widely used, for instance, to make kraft pulp, dry detergent, cleaning preparations, flat glass. They are also used for the preparation of numerous inorganic chemicals such as sodium carbonate, sodium sulphide, sodium silicate, sodium thiosulfate.

Sodium sulfate in the form of crude Glauber's salt is generally extracted from Glauber's salt deposit by three methods known respectively as brine, intermittent crystal harvesting and recovery of crystals from the permanent bed of sodium sulfate lakes. Each of the three methods has drawbacks. Recovering crystals from the permanent bed of sodium sulfate lakes. Each of the three methods has drawbacks. Recovering crystals from the permanent bed of a lake is generally made only if bed has relatively high purity, since the purity of the crystals depends largely upon the purity of the bed. Intermittent crystal harvesting is conducted by the crystallization during winter of deposits having a low mud content; in order to obtain sufficient salt for a year's operation, a very large area has to be harvested during the winter season. The success of the operation is also dependent upon the climatic conditions. The third method consists of pumping brine near saturation into earth-wall reservoirs, during the summer. When the temperature reaches about 30° F. in the fall, Glauber's salt is collected after having discarded the mother liquid. The salt is then harvested using various combinations of bulldozers, scrapers, loaders, trucks and drag lines. Generally, the current processing methods do not produce high grade white anhydrous salt because of contamination with mud, organic compounds, iron and magnesium sulfate.

The new process is relatively easy to conduct and economical. It may generally be continuously operated regardless of the season and despite high proportions of mud intermingled with the Glauber's salt in deposits.

There has now been found a process for extracting Glauber's salt from deposits which comprises:

(a) Heating the said portion to a temperature above the transition temperature of Glauber's salt, generally about 100° F. thereby producing a solution, and
(b) Collecting the upper portion of said heated portion.

By this method, the Glauber's salt deposits which are located under layers of mud, may be extracted by taking advantage of the fact that Glauber's salt is more soluble above its transition point. Unexpectedly, at the said temperature, providing sufficient water is in the deposit to dissolve the salt and other electrolytes, the mud will tend to settle down. It then becomes particularly easy to remove the upper portion of the solution which contains the native Glauber's salt substantially free from the mud.

In a particular embodiment, in accordance with the invention, water, heated to about 140°–150° F., under pressure, is pumped down to the base of the deposit and forced under pressure sufficient to move through the deposit, generally in the order of about 25 lbs./in.$^2$ or more. This dissolves a portion of the deposit which contains Glauber's salt and other electrolytes. The heavy particles and mud rapidly settle down near the base of the deposit. The upper portion of the hot solution is then pumped from the surface of the solution by means of at least one return pipe system. It is then further purified by clarification, evaporation, crystallization and drying.

In another embodiment, the Glauber's salt deposit is extracted with a large series of input and output pipes. The output pipes are connected so that a portion of the solution will be further treated while the remaining portion will be reheated and returned to the input pipes as a source of heat.

It has been found that for Northwestern Canada, the number of B.t.u. per pound of Glauber's salt generally required to raise the temperature of the deposit to 100° F., is between about 104–400, depending upon the ambient temperature. As thermal losses are high during winter, the B.t.u. requirement approaches 400, during the summer the requirement decreases and approaches 104.

In a preferred embodiment, the salt contents of the solution is adjusted, taking into account the nature of the electrolytes in the solution in order to optimize the recovery of Glauber's salt as will be seen later.

By this process of dissolving Glauber's salt in the deposit, the salt is reasonably free from the blanketing effect of the mud. A large inventory of salt results therefrom. The operations are not seriously affected by seasonal changes.

The expression "Glauber's salt deposit," or fraction of said expression, includes any deposit and particularly naturally occurring beds of Glauber's salt found, for instance, on the Canadian Prairies and in the Southwestern United States and the like, as well as those found in or under lakes. The expression "above the transition temperature of the Glauber's salt" means at a temperature where generally $Na_2SO_4$ and a solution thereof exists and where the sodium sulfate in the decahydrate form ceases to exist, theoretically this temperature is 32.48° C. or 90.5° F. but other salts or the variation in pressure may affect this transition point as is well known by those skilled in the art. Preferably, for practical purposes, 100° F. may be considered as the transition temperature.

Having thus generally described the invention, it will now be referred to in more detail by reference to the accompanying drawings in which:

FIG. 1 is a schematic view of the overall extracting apparatus suitable for obtaining a high grade sodium sulfate;
FIG. 2 is a phase diagram showing the solubility of sodium carbonate, sodium sulfate water system at low temperature.

APPARATUS

Referring to FIG. 1, reference number 10 designates a Glauber's salt deposit having therein a pit whose contour is shown as 12, which in turn, contains pipe 14 for feeding dissolving substances to the pit and raising its temperature above the transition temperature of the Glauber's salt. Generally, the dissolving substances are fed in the pit at a temperature of about 140°–150° F. As the material in the pit dissolves, the bulk of the mud 16 goes down the bottom 18 of the pit while the upper solution is pumped through pipe 20 up to by-pass 22 where it will be either, or partly, recirculated by means of pipe 24 through the heat exchanger 26 and back through pipe 14, and/or directly through pipe 28 to be purified. The dissolving substance is replenished at 29. As it leaves the pipe 28, the solution is treated in a tank 30 maintained at above 100° F. with a flocculating agent such as "Separan" M.G.L. (Trademark) which is added in a continuous manner by a constant delivery pump (not shown). The tank 30 has near its bottom, an outlet 32 for constantly removing the mud which settles at the bottom of the tank. The clarified solution leaves the upper portion of tank 30 via line 34 to an air cooled crystallizer 36. The crystallizer 36 comprises a fan 38 for cooling the solution and inclined sides to facilitate the removal of the Glauber's salt precipitate. The slurry is then passed to a centrifuge 40 or a filter for discarding the mother liquid via line 41. The precipitate is rinsed with hot water and then moved by means of a conveyer 42 into an agitated melting tank 43 heated to about 120°–125° F. by means of a solution recirculating from the submerged combustion evaporator chamber 46 via line 44. The Glauber's salt is dissolved and the anhydrous $Na_2SO_4$ precipitates out. This slurry is then passed via line 48 to a conical salt settler 50. The particles are allowed to settle at the bottom of settler 50. They are then dried through rotary dryer 52. The resulting product generally contains over 95% $Na_2SO_4$ even 99.5% and more.

The upper portion of the melt in settler 50 escapes through line 54 via outlet 56 to be further heated in the submerged combustion evaporator chamber 46 and then recycled via line 44 to the agitated melting tank 43.

Operation of a pit may be started by drilling a pilot hole to the desired depth in the deposit or by forcing a pipe down using the combined action of hydraulics and heat to remove the material. The outlet pipe 20 is kept near the surface of the pit and the solution is then pumped from the top of the pit through the heater located on the shore and back to the bottom of the pit through inlet pipe 14. Heat penetrates in the deposit, thus causing the Glauber's salt to dissolve at a temperature above the transition point of Glauber's salt. After a development of about a week, the pit generally has a size which allows the heavier portions of the mud to settle down to the bottom. A slightly muddy solution containing about 30% salt of which about 20% are sodium sulfate may be taken from the discharge of the pump at a rate in excess of 50 tons of sodium sulfate per 24 hours per pipe.

During the extraction, it is important that the solution does not crystallize. The design and operation of the return pumps should permit high circulation during cold weather to prevent frozen line. For that reason, return to the plant in a particular embodiment are maintained to at least 100° F. and the concentration is controlled to not exceed 33% total salts by weight, under which condition the desired anhydrous sodium sulfate. In another embodiment, the total salts solution has been kept in the 30–32% range in the summer and below 25% in winter. The concentration of the solution may be attained by controlling the addition of diluent. As the nature of deposits vary, these values vary and should be determined according to the nature of the solute found in the solution.

Thus for a given deposit, a study should preferably be made of the salt contained in the solution which may interfere with the crystallization, the purification steps or which may increase the danger of frozen line. In a particular embodiment, the extracted solution contained Glauber's salt and sodium carbonate. As the solubility of each salt is interdependent, a solubility relationship of the system $Na_2CO_3$—$Na_2SO_4$—$H_2O$ was obtained from the prior art, and a graph, thereof, was made as shown in FIG. 2. To prevent the crystallization, of the sodium carbonate, $Na_2CO_3$ in the solution must be maintained outside the composition zone contained by ABCD. This may be obtained by controlling the temperature and concentration during the extraction, or during the purification steps.

In a particular embodiment, the solution fed into the crystallizer contained 25% sodium sulfate, 7.5% sodium carbonate and about 67.5% water. The point corresponding to these concentrations was located in the FIG. 2, as $X_1$. A line was traced out from $Na_2SO_4 \cdot 10H_2O$ through $X_1$ and further on to the cooler isotherms. If the cooling was stopped at 70° F., the composition of the residual solutions would be 13% $Na_2SO_4$; 12.2% $Na_2CO_3$; 74.8% $H_2O$ ($Na_2SO_4/Na_2CO_3$ ratio=1.07/1) and the weight of $Na_2SO_4 \cdot 10H_2O$ crystallized per pound of solution would be as calculated by the material balance of $Na_2SO_4$, $x$ representing the weight of $Na_2SO_4 \cdot 10H_2O$ crystallized:

The percent sodium sulfate in the original solution being $0.250 \times (1)$
The percent sodium sulfate in the final solution being $0.130 \ (1-x) + 0.441 \times (x)$
It follows that $.0250 \times (1) = 0.130 \ (1-x) + 0.441 \times (x)$ (the factor 0.441 representing the ratio of $$\frac{Na_2SO_4}{Na_2SO_4 \cdot 10H_2O} \text{ or } \frac{142}{322} = 441)$$

Thus, $x=0.385$ pounds.

Therefore, the percent solids in the slurry would be 38.5%. If the cooling were continued to $x_3$, that is about 64° F., $Na_2CO_3 \cdot 10H_2O$ would begin to precipitate out. At this stage, the composition of the residual solution would be 9.5% $Na_2SO_4$, 13.5% $Na_2CO_3$, and 77% $H_2O$, or a ratio of $Na_2SO_4/Na_2CO_3$ of 0.7/1. On further cooling the composition of the residual solution would follow along BA as both hydrates would crystallize out. Thus, in order to obtain pure sodium sulfate with the present solution, the temperature would have to be maintained above 64° F.

EXAMPLES

The following will serve as examples to illustrate the invention without any intent of limiting the ambit of said invention.

Example 1

An input pipe was pushed into the bed with the hot solution flowing. A combined dissolving and washing effect was achieved which allows a penetration rate of about 10 feet per hour. A single input, output pipe, having a maximum input rate of about 30 U.S.G.P.M. at 140° F., was fed through a pit having a 40 foot bed of salt and extracted as already described with reference to the drawings. The average result obtained was 10–15 tons per 24 hours for 6 weeks of finished product of anhydrous $Na_2SO_4$ was obtained.

Example 2

Another pipe was placed into a pit having a 20 foot bed of salt under the condition specified in Example 1 and yielded about 5–7 tons per 24 hours.

As is evident from what has been said, other hydrated salts or salts which may dissolve in solution or other soluble deposit, may also be processed similarly, using the present teaching to remove the mud generally found with deposits. Thus, for extracting a natural deposit soluble in water and containing mud, a solution should be made of at least a portion of said deposit to allow the mud to settle down. The upper portion could then easily be collected. Although particular reference has been made to water which is a cheap solvent, other solvents could also be used as can easily be visualized providing the mud remains insoluble in them.

The embodiments of the invention for which an exclusive property or privilege is claimed are defined as follows:

1. An apparatus to extract and pre-purify in situ Glauber's salt from a subterranean deposit which generally contains mud, the apparatus comprising in combination:
   (a) a boiler containing water,
   (b) means for feeding said water from said boiler to said subterranean deposit, to form a solution with said deposit, and to thereby provide means for a portion of mud in said solution to settle down,
   (c) means for returning the upper portion of said solution to said boiler,
   (d) means to clarify said solution,
   (e) means to feed portions of said solution from said returning means to said clarifier,
   (f) means to replenish water into said boiler,
   (g) means to crystallize out the Glauber's salt,
   (h) means to feed said clarified solution from said clarifier to said crystallizer means,
   (i) in combination with said crystallizer means to centrifuge said Glauber's salt to discard water and to collect said salt,
   (j) a zone for mixing said Glauber's salt with pre-molten Glauber's salt,
   (k) a settling zone in combination with said mixing zone to precipitate the anhydrous sodium sulphate and
   (l) in combination with said settling zone and said mixing zone, an evaporating zone being in space relation to said boiler and being provided with a heating source to melt said Glauber's salt and to evaporate a portion of its water content, whereby the said evaporated water heats up said boiler and raises the temperature of the water which is to be fed into said subterranean deposit, said evaporating zone being provided with means for returning the molten Glauber's salt partially free of water to said settling and said mixing zones.

2. The apparatus as defined in claim 1 which further comprises means to dry said sodium sulfate in combination with said settler tanks.

3. A process for extracting and pre-purifying in situ Glauber's salt from a subterranean deposit which generally contains mud and Glauber's salt, said process comprising:

(a) contacting at least a portion of the subterranean deposit with hot water feed to form within said deposit an aqueous mixture containing dissolved sodium sulfate and undissolved mud at a temperature above the transition temperature of the Glauber's salt;
   (b) allowing at least a portion of the mud to settle to the bottom of the mixture formed in step (a);
   (c) withdrawing the upper portion of the mixture in step (b); and
   (d) conducting steps (b) and (c) at a temperature above the transition temperature of the Glauber's salt.

4. A process according to claim 3 wherein:
   the hot water feed used in step (a) is heated to a temperature of at least about 140° F.;
   the aqueous mixture formed in step (a) has a total concentration of dissolved salts of no more than about 33 percent by weight; and
   at least a portion of the upper portion of the mixture withdrawn in step (c) is combined with the hot water feed in step (a) at a temperature of at least about 140° F.

5. A process according to claim 4 wherein:
   the hot water feed used in step (a) is heated to a temperature of between about 140° F. and about 150° F.; and
   at least a portion of the upper portion of the mixture withdrawn in step (c) is combined with the hot water fed in step (a) at a temperature of between about 140° F. and about 150° F.

References Cited
UNITED STATES PATENTS

| | | | |
|---|---|---|---|
| 1,984,833 | 12/1934 | Jones et al. | 23—37 |
| 2,333,138 | 11/1943 | Adams | 299—5X |
| 2,979,317 | 4/1961 | Bays | 299—4 |
| 3,050,290 | 8/1962 | Caldwell et al. | 299—4 |

ERNEST R. PURSER, Primary Examiner

U.S. Cl. X.R.

23—37